US006978624B2

(12) United States Patent
Carlson et al.

(10) Patent No.: US 6,978,624 B2
(45) Date of Patent: Dec. 27, 2005

(54) THERMOELETRIC COOLER CONTROLLER

(75) Inventors: Robert T. Carlson, Surrey (CA); Fang-Xin Wang, New Westminister (CA)

(73) Assignee: FSONA Communications Corporation, Vancouver (CA)

(*) Notice: Subject to any disclaimer, the term of this patent is extended or adjusted under 35 U.S.C. 154(b) by 0 days.

(21) Appl. No.: 10/639,872

(22) Filed: Aug. 13, 2003

(65) Prior Publication Data
US 2004/0031272 A1 Feb. 19, 2004

Related U.S. Application Data

(62) Division of application No. 09/769,082, filed on Jan. 24, 2001.

(51) Int. Cl.[7] .......................... F25B 21/02; F25D 23/12
(52) U.S. Cl. .................. 62/3.7; 62/259.2; 165/104.21; 136/203
(58) Field of Search .................. 62/3.7, 3.2, 259.2; 165/104.21; 136/203

(56) References Cited

U.S. PATENT DOCUMENTS

| 3,939,435 | A | | 2/1976 | Suzuki .................. 330/51 |
| 4,995,045 | A | | 2/1991 | Burley et al. .......... 372/38.09 |
| 5,431,021 | A | * | 7/1995 | Gwilliam et al. ........ 62/3.7 |
| 5,521,933 | A | | 5/1996 | Sosa .................. 372/38 |
| 5,579,328 | A | | 11/1996 | Habel et al. .......... 372/31 |
| 5,654,549 | A | | 8/1997 | Landecker et al. ...... 350/332 |
| 5,704,213 | A | * | 1/1998 | Smith et al. .......... 62/3.7 |
| 5,710,652 | A | | 1/1998 | Bloom et al. ......... 359/152 |
| 5,754,323 | A | | 5/1998 | Rivers et al. ......... 359/152 |
| 5,754,574 | A | | 5/1998 | Lofthouse-Zeis et al. ... 372/34 |
| 5,760,939 | A | | 6/1998 | Nagarajan et al. ...... 359/161 |
| 5,777,737 | A | * | 7/1998 | Priest ................ 356/466 |
| 5,777,768 | A | | 7/1998 | Korevaar ............. 359/172 |
| 5,790,291 | A | | 8/1998 | Britz ................. 359/159 |
| 6,094,918 | A | * | 8/2000 | Burbidge et al. ...... 62/3.7 |
| 6,246,498 | B1 | | 6/2001 | Dishman et al. ...... 359/123 |
| 6,359,918 | B1 | * | 3/2002 | Bielas ............... 372/38.01 |
| 2004/0022537 | A1 | * | 2/2004 | Mecherle et al. ..... 398/41 |

OTHER PUBLICATIONS

W.M. Bruno, R. Mangual, and R.F. Zampolin, Diode Laser Spatial Diversity transmitter, pp. 187-194, SPIE vol. 1044 Optomechanical Design of Laser Transmitters and Receivers (1989).

R. Arnold, E. Woodbridge, G. Smith, G. Taylor, R. Trissel, R.J. Feldman, and R.A. Gill, 500 Kilometer 1 GBPS Airborne Laser Link, pp. 178-197, SPIE vol. 3266 (1998).

G.S. Mecherle, POCIT Portable Optical Communicators: VideoBeam and EtherBeam, pp. 20-28, SPIE vol. 3850 Conference on Optical Wireless Communications II (1999).

T.H. Carbonneau, G.S. Mecherle, SONAbeam Optical Wireless Products, pp. 45-51, SPIE 3932 Free Space Communications Technology XII (2000).

Carlson et al., "Wideband Laser and Receivers for Lasercom Applications", IEEE, pp. 409-413, 1995.

(Continued)

Primary Examiner—Chen-Wen Jiang
(74) Attorney, Agent, or Firm—Fulbright & Jaworski L.L.P.

(57) ABSTRACT

A highly efficient thermoelectric cooler controller for temperature stabilization. The circuit comprises a temperature sensor and a thermoelectric cooler, both in thermal communication with a component to be temperature stabilized. The circuit further comprises a power amplifier electrically coupled to the thermoelectric cooler. The power amplifier is employed as a controlled current source to efficiently supply current to the thermoelectric cooler when maximum cooling is required.

9 Claims, 14 Drawing Sheets

OTHER PUBLICATIONS

Binkley et al., "A Low-Noise, Wideband, Integrated CMOS Transimpedance Preamplifier for Photodiode Applications", IEEE conference, pp. 730-734, 1991.

Ayling et al., "First Demonstration of a High Power, Wide Band Microwave Amplifier Based Upon an Optically Coupled Transistor", IEEE, pp. 39-42, 1999.

* cited by examiner

CIRCUIT COMPONENT DESIGNATIONS

| R1  | 1.00k            |
|-----|------------------|
| R2  | 28.0             |
| R3  | 499              |
| R4  | 499              |
| R5  | 412/0603         |
| R6  | 5k/SM4W502       |
| R7  | 261/0603         |
| R8  | 91/1w            |
| R9  | 255/0603         |
| R10 | 249              |
| R11 | 1.0/0.125w/1%    |
| R13 | 1.00k            |
| R15 | 4.7              |
| R16 | 28.0             |
| R17 | 100              |
| R18 | 49.9             |
| R19 | 1.0/0.125w/1%    |
| R20 | 2.4/1w           |
| R21 | 200/SM4W201      |
| R22 | 750/0603         |
| R23 | 1.00k            |
| R25 | 205/0603         |
| R26 | 1.52k/0603       |
| L1  | MI1206K900R-00   |
| L2  | HZ0805E601R-00   |
| L3  | 18µH/0.2DCR      |
| L4  | 560µH/125mA/11DCR|
| L5  | MI1206K900R-00   |
| L6  | 18µH/0.2DCR      |
| L7  | 560µH/125mA/11DCR|
| L8  | MI1206K900R-00   |
| L9  | HZ0805E601R-00   |
| L10 | HZ0805E601R-00   |
| L11 | HZ0805E601R-00   |
| L12 | 560µH/125mA/11DCR|
| L13 | HZ0805E601R-00   |

| C1  | 0.1µF      |
|-----|------------|
| C2  | 10µF/35V   |
| C3  | 33µF/16V   |
| C4  | 33µF/16V   |
| C6  | 1nF        |
| C7  | 1µF        |
| C11 | 3.3µF      |
| C13 | 0.1µF      |
| C14 | 1µF        |
| C15 | 1µF        |
| C16 | 3pF/0603   |
| C18 | 1µF        |
| C19 | 0.1µF      |
| C22 | 3pF/0603   |
| C23 | 1µF        |
| C24 | 3pF/0603   |
| C25 | 1µF        |
| C26 | 1µF        |
| C29 | 100pF/0603 |
| C30 | 100pF/0603 |
| C31 | 100pF/0603 |
| C32 | 0.1µF      |
| C33 | 1µF        |
| C34 | 4.7µF/16V  |
| C35 | 0.1µF      |
| C36 | 0.1µF      |
| C37 | 0.1µF      |
| C38 | 0.1µF      |
| J1  | WM18002-ND |
| J2  | WM18002-ND |
| J3  | WM18004-ND |
| U2  | RF2420     |
| U3  | CD4051BCM  |
| U4  | TVS_4      |
| U5  | TVS_4      |

| Q1   | ERA-2SM              |
|------|----------------------|
| Q2   | ERA-6SM              |
| Q3   | F2248                |
| Q4   | ERA-2SM              |
| TP1  | ED5043-ND            |
| TP2  | ED5043-ND            |
| TM1  | 43045-1200           |
| TM2  | 43045-0608           |
| D1   | 6.8V/BZX64C6V8ZXCT-ND|
| D2   | P521CT-ND            |
| D3   | P523CT-ND            |
| D4   | BATS4CT-ND           |
| D5   |                      |
| D6   |                      |
| D7   | MMBD452LT1           |
| TVS1 | SMAJ12CADICT-ND      |

FIG. 9C

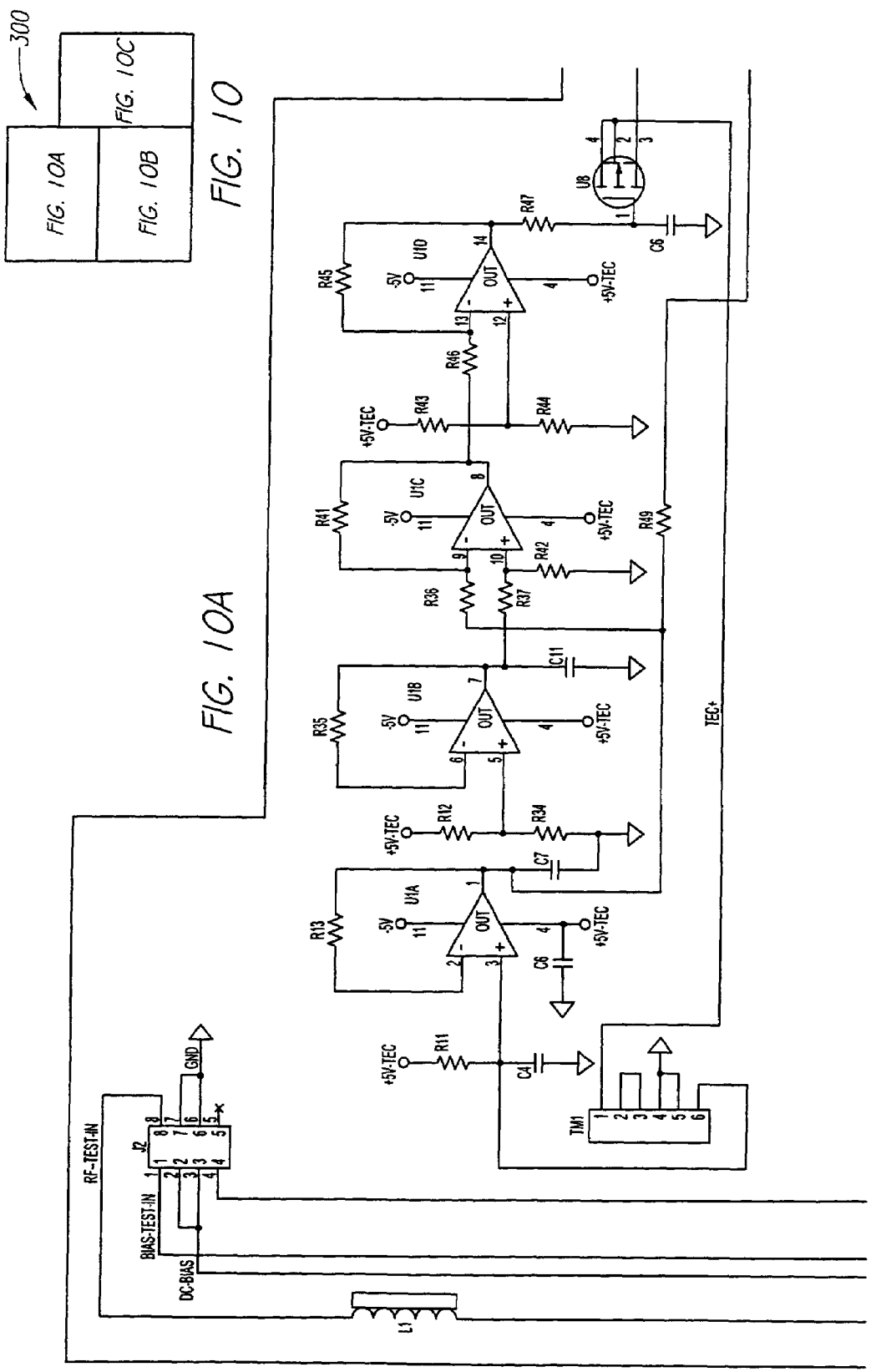

CIRCUIT COMPONENT DESIGNATIONS

| | | | | | | |
|---|---|---|---|---|---|---|
| R11 | 40.2k | R50 | 10.0k/0603 | U1 | LM2902M |
| R12 | 40.2k | R51 | 10.0k/0603 | U3 | LM2902M |
| R13 | 8.05k | R52 | 10.0k/0603 | U4 | NDT456P |
| R14 | 5.1/1w | | | U5 | MAX4503EUK |
| R15 | 40.2k | L1 | HZ0805E601R-00 | U6 | NDT456P |
| R16 | 1.00k | L2 | HI1206N101R-00 | U7 | CD4051BCM |
| R17 | 5k/SM4W502-ND | | | U8 | NDT456P |
| R18 | 1k/SM4W102-ND | C1 | 1NF/0603 | | |
| R19 | 1.00k | C2 | 4.7µF/16V | TM1 | CON6 |
| R20 | 9.09k | C3 | 0.1µF | | |
| R21 | 3.01k | C4 | 0.1µF | D1 | 6.8V/BZX84C6V8ZXCT |
| R22 | 887/0603 | C5 | 33µF/16V | | |
| R23 | 2.00k | C6 | 0.1µF | | |
| R24 | 26.7k | C7 | 0.1µF | | |
| R25 | 40.2k | C8 | 1µF | | |
| R26 | 4.99k | C9 | 0.1µF | | |
| R27 | 9.09k | C10 | 33µF/16V | | |
| R28 | 10.0k | C11 | 0.1µF | | |
| R29 | 590/0603 | C12 | 0.1µF | | |
| R30 | 475/0603 | C13 | 1µF | | |
| R31 | 806/0603 | C14 | 0.1µF | | |
| R32 | 1.24k/0603 | C15 | 1nF/0603 | | |
| R33 | 2.74k/0603 | C21 | 1NF/0603 | | |
| R34 | 10.0k | C22 | 1nF | | |
| R35 | 8.06k | C23 | 1nF | | |
| R36 | 2.00k | C24 | 1nF | | |
| R37 | 2.00k | C29 | 1µF | | |
| R38 | 2.26k | | | | |
| R39 | 3.01k | J1 | WM18203-ND | | |
| R40 | 3.01k | J2 | WM18203-ND | | |
| R41 | 30.1k | J3 | WM18205 | | |
| R42 | 30.1k | | | | |
| R43 | 10.0k | | | | |
| R44 | 4.32k | | | | |
| R45 | 6.04k | | | | |
| R46 | 6.04k | | | | |
| R47 | 49.9k | | | | |
| R49 | 49.9 | | | | |

FIG. 10D

THERMOELETRIC COOLER CONTROLLER

PRIORITY

This is a divisional U.S. patent application Ser. No. 09/769,082, filed Jan. 24, 2001, the disclosure of which is incorporated herein by reference, to which priority under 35 U.S.C. § 120 is claimed.

BACKGROUND

1. Field of the Invention

The field of the present invention is laser communications.

2. Background of the Invention

High quality video and audio signals and high bandwidth data signals (called "broadband" signals) are becoming increasingly desirable in today's digital world. A significant challenge is getting high bandwidth communications to end users, or reaching the so-called "last mile" market segment. Most U.S. metro centers are serviced by multiple providers over SONET fiber optic rings, with fiber to certain major buildings. Many, if not most, buildings, are not on fiber rings, however, and laying fiber can be time consuming and prohibitively expensive. In some instances, it may be practically impossible to obtain property rights-of-way to provide a high-bandwidth connection to the desired location.

While wireless radio frequency (RF) systems can provide data rates of 155 Mbps, there is limited spectral bandwidth available, communication licenses are generally required, the possibility for mutual interference exists, and the requisite equipment is expensive. Extending to higher data rates is difficult for RF frequencies with good atmospheric propagation characteristics.

Atmospheric laser communication provides a potential alternative for wireless point-to-point communications of high bandwidth signals. For instance, laser transceivers are capable of sending high bandwidth signals through the atmosphere. However, commercially available laser systems capable of transmitting high bandwidth signals across distances longer than a small city block are prohibitively large and extremely expensive. Moreover, several challenges must be overcome to facilitate high bandwidth laser communications over significant distances. One consideration is ensuring reliable communications despite varying atmospheric conditions. Since conditions such as fog in particular are difficult for low power laser beams to penetrate, ensuring uninterrupted atmospheric laser communications requires the use of high power lasers. A second design consideration is preventing high power laser beams used in an atmospheric laser system from causing eye or tissue damage if received by people. At short wavelengths, non-eyesafe power levels can permanently damage the eye before the victim becomes aware, because the retina has no pain sensors Further complicating the use of atmospheric lasers is a phenomenon called scintillation that causes the random fading of signals transmitted through the atmosphere. It is understood that the atmosphere is not homogeneous, in that the index of refraction of air is not constant due to wind or turbulence. The transmission of a beam of light through the atmosphere is subject to these variations in the index of refraction such that the beam may be momentarily deflected from a straight path. With such deflection, an observer of the beam perceives the source to be flickering. Such flickering is highly disruptive to data transmission. A solution may be found in aperture averaging, by increasing the size of the apertures of the receiving unit. The intensity of the source can, to a certain extent, mitigate losses in transmission where the sensitivity of the receiver is not correspondingly decreased. Often, however, physical and practical limitations detract from such solutions.

To significantly overcome the effect of scintillation, spatial diversity transmitters have been constructed which employ multiple diode lasers arranged to produce displaced parallel beams. As these beams diverge, they overlap one another. A receiver displaced from the transmitter thus receives uncorrelated light at the receiver when aligned with the beams. As it is unlikely that all beams will be simultaneously diverted, the receiver is able to receive uninterrupted data from at least some of the plurality of transmitters. It has been found that the normalized standard deviation of the intensity at the receiver is reduced by the square root of the number of transmitting elements when properly separated. Reference is made to W. M. Bruno, R. Mangual, & R. F. Zampolin, *Diode Laser Spacial Diversity Transmitter*, pp. 187–194, SPIE vol. 1044, Optomechanical Design of Laser Transmitters and Receivers (1989), the disclosure of which is incorporated herein by reference.

One structural application of the very principles presented in the foregoing publication is found in U.S. Pat. No. 5,777,768, the disclosure of which is also incorporated herein by reference. Transceivers using spaced multiple laser transmitters are used for two-way communication.

Another example of laser transceivers used for communications purposes may be found in application Ser. No. 09/434,913, filed Nov. 5, 1999, for a Portable Laser Transceiver, the disclosure of which is further incorporated herein by reference. The portable laser transceiver disclosed therein is capable of transmitting near-broadcast quality video, audio, and Ethernet signals.

For broadband fiber optic applications, a number of pre-fabricated integrated circuits are available for driving lasers at data rates of 1 gigabit per second (Gbps) or more. These laser drivers are used to drive the now-common fiber optic networks. These integrated circuits, however, are inadequate for high power lasers used in atmospheric laser communications, as they typically provide drive current capability of only 50 to 75 mA. Such low drive current is insufficient to overcome the effects of atmospheric scintillation at distances beyond of approximately the length of a laboratory.

When a high power laser is used, one method that has been used to achieve the high drive current needed to overcome atmospheric scintillation effects is the use of a RF Bias-Tee. This method typically uses a 50 ohm bias tee, thus coupling the broadband signal into a 50 ohm load—typically consisting of a 47 ohm matching resistor in series with a 3 ohm laser diode—to achieve a broadband match. The RF bias-tee approach, however, is not practical for high drive currents because the majority of the output power is wasted in the matching resistor. For example, a 700 mA drive current typically results in 5.8 watts of power dissipation in the 50 ohm bias tee.

A high current 4:1 broadband RF transformer may be used with a bias-tee approach to double the output drive current and transform the 50 ohm into a 12.5 ohm source, as seen by the load. However, this alternative approach still requires a 9 ohm resistor to match the source to a 3 ohm laser diode. Thus, the majority of the drive power is still wasted in the matching resistor. A transformer with a higher ratio could theoretically solve the lost power problem, but high ratio transformers capable of handling currents in excess of 200 mA and having a broadband response of up to 1 Ghz are not available.

U.S. Pat. No. 5,521,933 discloses a method of positioning the laser diode remotely from the driver circuit to reduce the effect on the laser diode of heat generated by the driver circuit. This method still uses a matching resistor, located remotely from the laser diode, which again causes power loss in the output drive current.

Regardless of the driving frequency, when driving a laser diode at high power, it is frequently desirable to use a thermoelectric cooler (TEC) to maintain the temperature stability of the laser diode. In many applications, the temperature stability of the laser diode may be important to maintain the output signal of the laser diode within a specified set of parameters. The cooling function of a TEC is controlled by a TEC controller circuit. Typical implementations of TEC controllers are either pulse-width-modulated (PWM) or proportional controllers. PWM controllers are undesirable for use in communication systems with sensitive receivers because PWM controllers tend to generate unwanted noise. Proportional controllers such as the proportional-integral-differential (PID) type are therefore commonly used in such communication systems.

PID controllers, however, tend to dissipate the most heat when maximum cooling at the laser diode is required. The heat dissipation occurs because PID controllers function as a current source, having a compliance voltage that is significantly less than the supply voltage. For example, a PID controller operating off a 5V supply at its maximum rated current output typically has a useable compliance voltage of about 3V. The difference between the supply voltage and the useable compliance voltage tends to be dissipated in the controller as heat. Thus, in the most demanding cooling conditions such as hot weather, a PID controller tends to generate even more heat.

A need, therefore, exists for small and efficient, yet powerful laser transceivers that are capable of transmitting and receiving high power and high bandwidth signals across distances greater than a single city block. A need also exists for a means to efficiently cool high powered laser transmitters used in such transceivers.

SUMMARY OF THE INVENTION

The present invention is directed to thermoelectric cooling circuitry and methods of operating the same. The thermoelectric cooling circuitry comprises a temperature sensor, a thermoelectric cooler, and a power amplifier. The temperature sensor and the thermoelectric cooler are both held in thermal communication with a component that is to be temperature stabilized. Both are also electrically coupled to the power amplifier.

In a first separate aspect of the present invention, the power amplifier is operated as a controlled current source to efficiently supply current to the thermoelectric cooler at times when maximum cooling is required.

In a second separate aspect of the present invention, the temperature sensor is a thermistor and the voltage drop across the thermistor at a given temperature is compared to a reference voltage. The reference voltage corresponds to the voltage drop across the thermistor when the thermistor when operated at a specific temperature.

In a third separate aspect of the present invention, the thermoelectric cooler has an optimal operating current which corresponds with the maximum cooling requirement of the component.

In a fourth separate aspect of the present invention, the impedance of the thermoelectric cooler is such that substantially all of the supply voltage is dropped across the thermoelectric cooler when the maximum cooling requirement of the component is being met.

In a fifth separate aspect of the present invention, any of the foregoing aspects are contemplated in combination.

Accordingly, it is a principal object of the present invention to provide an improved thermoelectric cooler circuit and a method of operating the same. Other and further objects and advantages will appear hereinafter.

BRIEF DESCRIPTION OF THE DRAWINGS

In the figures, wherein like numbers reflect elements having similar function:

FIG. 9 is a schematic diagram of a laser driver that may be used with the transceivers of FIG. 5 or 8;

FIG. 9C is a chart showing the values of components in the schematic diagrams depicted in FIGS. 9A and 9B;

FIG. 10 is a schematic diagram of a complementary circuit for the laser driver of FIG. 9;

FIG. 10A is a first magnified portion of the schematic diagram depicted in FIG. 10;

FIG. 10D a chart showing the values of components in the schematic diagrams depicted in FIGS. 10A–C.

DETAILED DESCRIPTION OF THE PREFERRED EMBODIMENT

Figure 1:
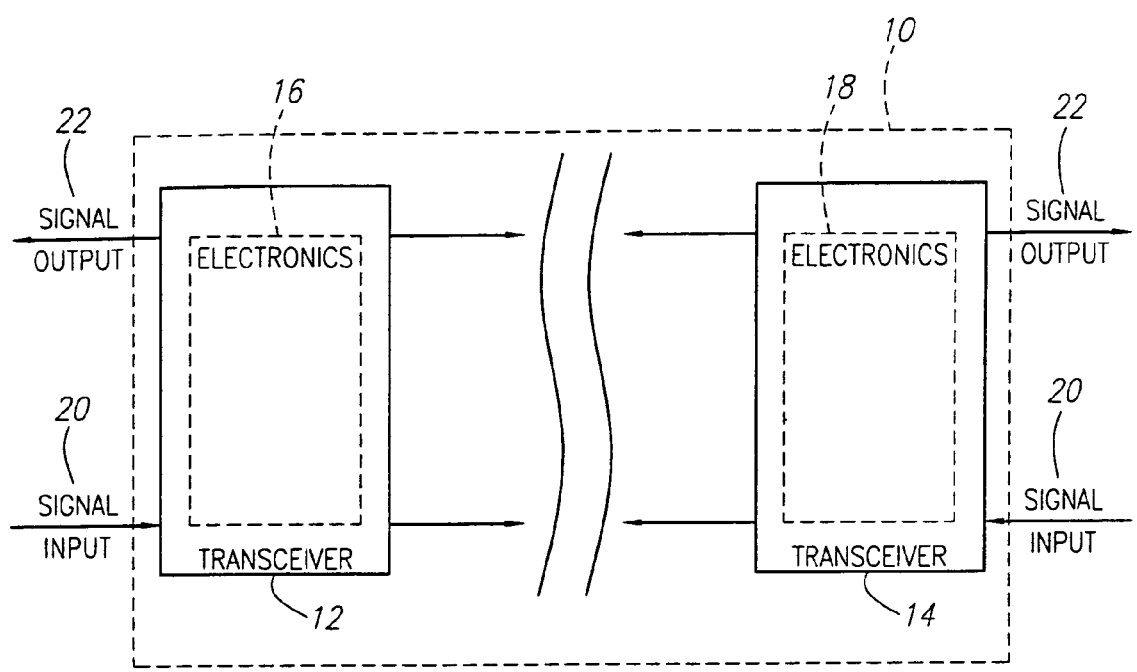
FIG. 1 is a schematic drawing of a laser communication system.

Turning in detail to the drawings, FIG. 1 illustrates a laser communication system 10 comprising a first laser transceiver 12 and a second laser transceiver 14, each transceiver 12, 14 having a digital signal input 20 and digital signal output 22 that carry the communication signals being transmitted and received. The signal input 20 and the signal output 22 may carry either electrical or optical signals of various types. Compatible electrical signals may be carried on electrical cables such as Category 5 cable with RJ 45 connectors, for example, and the signals may conform to protocols such as TCP/IP, IPX, Fast Ethernet, or others known in the art, operating on physical layers such as STS-3, STS-12, or others known in the art. Compatible optical signals may be carried on fiber optic cables, and the signals may conform to protocols such as SONET, ATM, or others known in the art, operating on physical layers such as OC-3, OC-12, or others known in the art.

Electronics 16, 18 within each transceiver 12, 14 use the digital signal input 20 to drive the outgoing laser signals and convert the incoming laser signals into appropriate digital signal output 22. Preferably, the laser communication system 10 is capable of transmitting and receiving laser signals a bandwidth of at least 155 Megabits per second over distances of at least eight kilometers in favorable weather conditions, and at least approximately two kilometers in foggy conditions according to a London, England fog environment with 99% availability. More preferably, the system is capable of transmission across like distances and conditions at a bandwidth of at least 622 Megabits per second.

Preferably, each laser has a nominal output wavelength of 1.5 μm. One of the principal advantages of 1.5 μm wavelength is that eyesafe intensity levels are approximately 50 times greater than at 0.8 μm. This is because for near-infrared wavelengths longer than 1.4 μm, the light is absorbed by the lens and cornea, and is not focused onto the retina. For 1.5 μm, the eyesafe power levels are the same as levels for heating of the skin, as it is the same effect. Also, at short wavelengths, non-eyesafe power levels can permanently damage the eye before the victim becomes aware, because the retina has no pain sensors. At 1.5 μm, if non-eyesafe power levels are encountered, the sensation of heat (or even pain) can be felt on the surface of the eyeball, and the natural blink reflex is induced.

The use of 1.5 μm wavelength has other benefits. Since the eyesafe intensity level at 1.5 μm is 50 times greater than at 0.8 μm, and since the intensity is inversely proportion to the square of the aperture diameter, this means that for a given power level, the diameter of the transmitting aperture can be seven times smaller at 1.5 μm than 0.8 μm. This facilitates the use of multiple transmitting apertures for scintillation reduction. Additionally, atmospheric attenuation is reduced at 1.5 μm relative to shorter wavelengths. The 1.5 μm wavelength region also corresponds to the low loss region for modern fiber optics.

Figure 2:
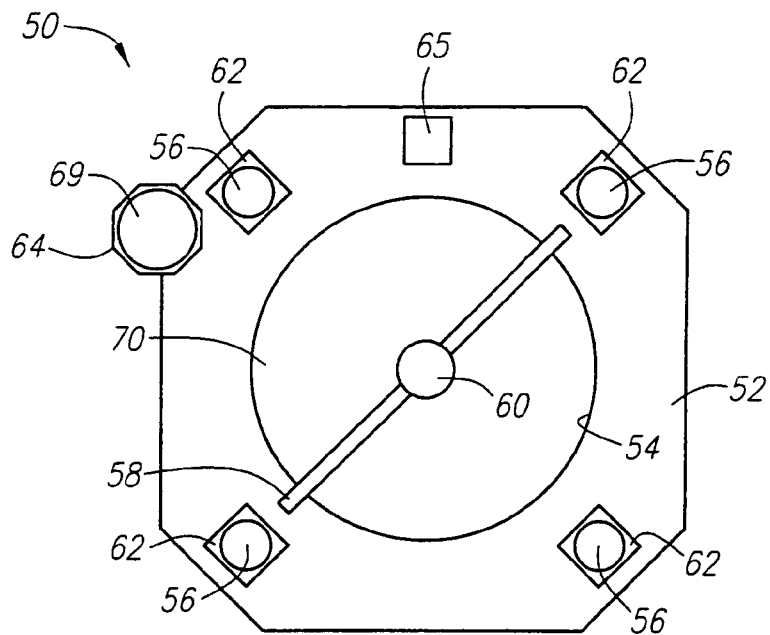
FIG. 2 is a front view of a transceiver according to a first embodiment.
Figure 3:
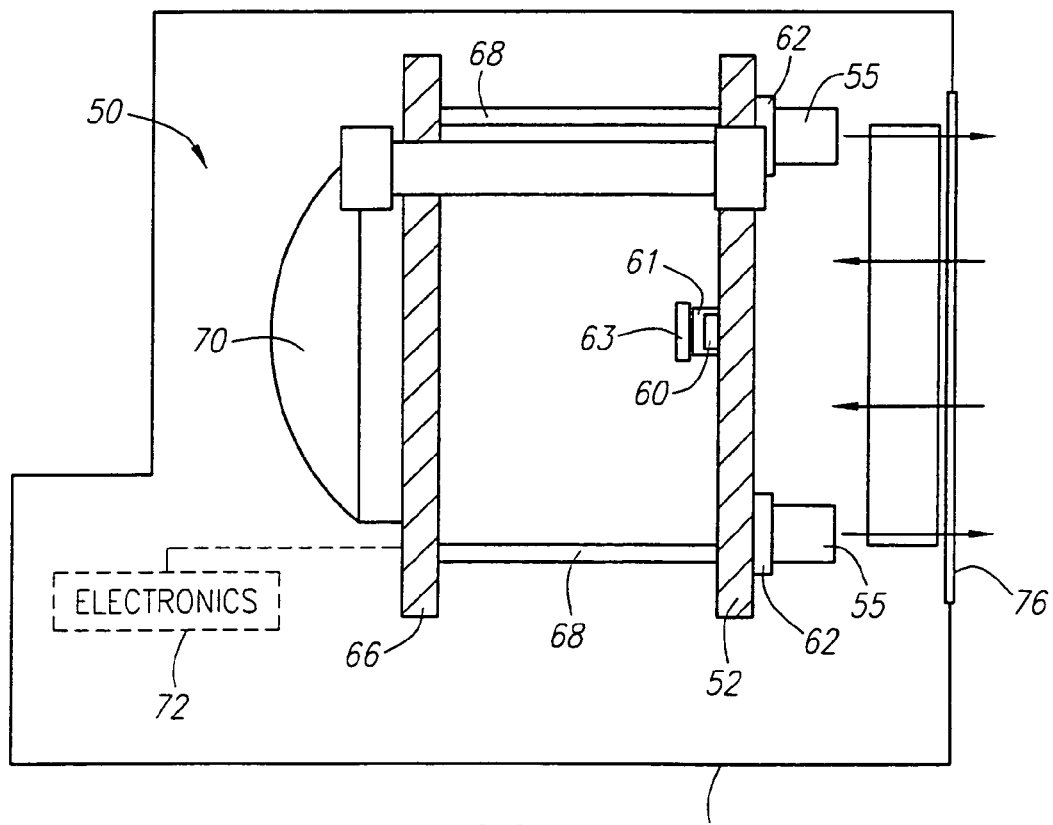
FIG. 3 is a side view of the transceiver in FIG. 2.

FIGS. 2 and 3 illustrate one embodiment of a transceiver 50 directed to laser communication. FIG. 2 shows a front view of the transceiver 50 having a front plate 52 with a large centrally located receiving aperture 54 and four laser apertures 56 spaced about the receiving aperture 54. The diameter of the receiving aperture 54 is approximately twenty (20) centimeters. A narrow support beam 58 crosses the receiving aperture 54 and supports a photodiode 60, a background filter 61, and, if needed, one or more field correcting lenses 63, all of which are centrally located in relation to the receiving aperture 54.

High power laser transmitters 62 are disposed within each of the laser apertures 56 such that the laser transmitters 62 emit beams that are substantially parallel to each other. Each laser diode 62 responds to an amplified laser data signal to generate an intensity modulated light signal. Each laser 56 preferably produces an average power of at least eighty (80) milliwatts and has a nominal wavelength of 1,550 nanometers (1.5 μm), within the eyesafe region. As the laser diode 62 tends to emit a wide angle signal of about 30° cone angle, a lens 55 receives the laser output. The lens design is flexible in setting the beamwidth; that is, the beamwidth may be adjusted during production by adjusting the spacing between the lens 55 and the laser diode 62. This adjustment may be made by way of a threaded connection, or, more preferably, by using a vacuum chuck and micrometer positioner to position the lens. Once the desired lens position is reached, the lens 55 may be epoxied in place. After the epoxy is cured, the vacuum is released, and the micrometer positioner is removed. The range of beamwidth (i.e. beam divergence angle) adjustment provided by the lens 55 ranges from 0.3 mrad to greater than 3.5 mrad. If the laser diode 54 has a spatially elliptical output, a circularizing optic (not shown), which may be a cylindrical lens or prism pair, may be added. As noted before, the lasers 54 are all aligned such that the collimated beams are parallel.

A sighting scope 64 may be located along an outer portion of the front plate 52 for aiming the transceiver 50 at a second transceiver (such as the transceiver 14 shown in FIG. 1). As the sighting scope 64 is intended for initial alignment of a transceiver pair (e.g., the laser transceivers 12,14 shown in FIG. 1), the sighting scope 64 may be removed after this alignment is attained. Alternatively, a CCD (charge coupled device) sensor 65 may be added to a transceiver 50 and used to facilitate alignment of a transceiver pair. Connection of the CCD 65 (or CCD 256 in FIG. 8) with a controller 250 is illustrated schematically in FIG. 8. When the CCD 65, 256 is coupled with a controller 250, a frame grabber 257 extension to the controller 250 may be used to capture images of what is within the line of sight of the transceiver 12. Such images may be transmitted or downloaded from the controller 250 to a remote location, with an external interface operating a protocol such as SNMP, Ethernet, or another protocol known in the art.

Referring now to FIG. 3, the front plate 52 is connected to a rear plate 66 using support rods 68. The rear plate 66 supports a focusing reflector 70, which is centrally aligned with the receiving aperture 54 such that the photodiode 60 is positioned at the focal point of the focusing reflector 70. The focusing reflector 70 is approximately equal in diameter to the aperture 20 and facing in a parallel direction with the lasers 62.

The receiver portion of the transceiver 50 includes a receiving aperture 54, a focusing reflector 70, a photodiode 60, a background rejection filter 61, and electronics 72. The focusing reflector 70 focuses the incoming optical beam onto a photodiode receiver 60. The fast design enables the large aperture 54 for collection efficiency, yet provides a very short focal length—both for compactness, and to achieve the largest field-of-view for a given detector diameter. The preferred f-number of the reflector 70 is approximately 0.67. As the f-number of the focusing reflector 70 decreases, off axis optical aberrations increase.

Mangin mirror or parabolic reflector approaches may be used for the focusing reflector 70 according to separate embodiments. A catadioptric design, the Mangin mirror is a negative meniscus lens with a mirrored rear surface which combines a compact overall design with a short focal length. The presence of both reflective and refractive elements in a Mangin mirror provides sufficient degrees of freedom to keep the amount of optical aberration within acceptable limits over the entire optical field of view, such that no additional optical corrector lens is necessary.

A parabolic reflector may be used for the focusing reflector 70 according to an alternative embodiment. A parabolic reflector has a single reflective surface, and requires one or more field corrective lenses to sufficiently correct aberrations. The parabolic reflector may therefore comprise one or more optical elements 63 to control the amount of aberration near the edges of the field of view. In placing the corrector lenses 63 near the focal plane, the corrector lenses 63 may be mounted in the same mechanical assembly that holds the detector 60. Multiple corrector lenses may be placed thusly to provide a higher degree of aberration control.

In a third reflector embodiment, the focusing reflector 70 comprises a mirror having a more general conic or aspheric optical surface and one or more corrector lenses (not shown). A conic or aspheric mirror provides a limited amount of aberration control, thus reducing the number of corrector lenses needed to properly focus the incoming signals.

To reduce interference and background noise from ambient light and other sources, the optical path of the receiver advantageously includes a flat or hemispherical background rejection filter 61. The filter 61 may be comprised of alternating layers of dielectric material deposited on a glass or crystalline substrate. This construction results in a peak transmission at band center of over 65%. The filter 61 may be located at the receiving aperture 54. However, such a configuration requires a large and costly filter, adding weight and size to the assembly 50. Preferably the filter 61 is located between the focusing reflector 70 and the photodiode 60. A bandpass filter nominally centered at 1500 nanometers may be used. However, if the bandpass filter is a flat multilayer dielectric filter, when receiving light rays from both small and large angles of incidence with respect to normal characterized by a low f-number optical system, then the passband is shifted for the different angles of incidence. To correct this, then, a much larger passband for a flat filter is to be used (about a 400 nanometer filter), or a hemispherical filter may be used since all of the incident rays are normal to the filter surface. A hemispherical filter centered at the nominal laser wavelength of 1,550 nanometers and having a passband width of 100 nanometers or less may be used.

A bandpass filter inherently requires the use of multilayer dielectric technology. A long wave pass approach may be used in conjunction with a detector 60 having predictable responsivity roll-off to create an effective bandpass filter. In one embodiment, the detector responsivity rolls off significantly between 1500 and 1700 nm, and is effectively zero beyond 1700 nm. Coupling this detector 60 with a long wave pass filter transmitting 1500 nm and above wavelength, the resulting combination provides an effective bandpass filter. A long wave pass filter, as used in conjunction with a detector as described above, may be dielectric, and flat or hemispherical in shape. As an alternative to a long wavepass multi-layer dielectric filter, the filter 61 may be an absorptive filter.

If a hemispherical filter 61 is used, its center of curvature is located near the focal point of the reflector 70. Using a standard TO-8 size detector package results in a hemispheric filter dome having an outer diameter of approximately twenty-two (22) millimeters and a thickness of 2.5 millimeters. In an embodiment utilizing one or more corrector lenses 63, the corrector lenses 63 may be used to create an afocal region in front of the photodiode 60 in which a filter 61 having a flat shape would be placed.

The transceiver may also include a sealed protective enclosure 74 as shown in FIG. 3. The protective enclosure 74 protects the transceiver from weather conditions and provides an enclosed environment in which the transceiver may operate. At the front cover of the protective enclosure 74 is an acrylic filter 76 covering the large aperture 54. The acrylic filter 76 is transparent to the operational wavelength of the laser transmitters 62, but limits transmission of visible light to prevent introduction of noise and heat from this light. Further, a stray light baffle 75 is preferably placed between the transceiver 12 and the acrylic filter 76 to reduce interference from stray light, and electromagnetic and RF sources. The baffle 75 is preferably a honeycomb of thin aluminum, approximately three inches in thickness, with a face-to-face hex cell size of approximately $11/32$ inch.

Figure 4:
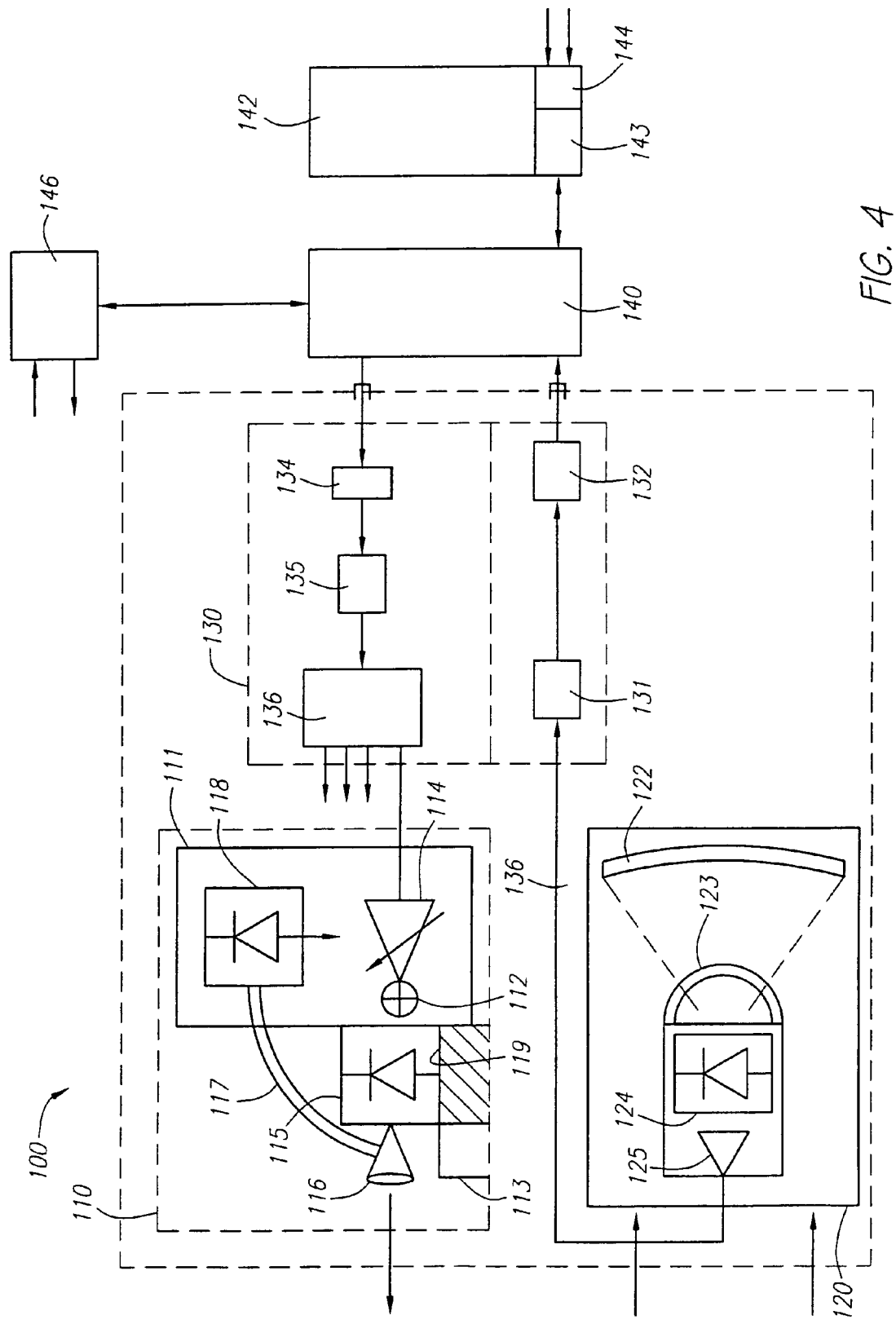
FIG. 4 is a schematic diagram of a transceiver and associated devices according to a second embodiment.
Figure 5:
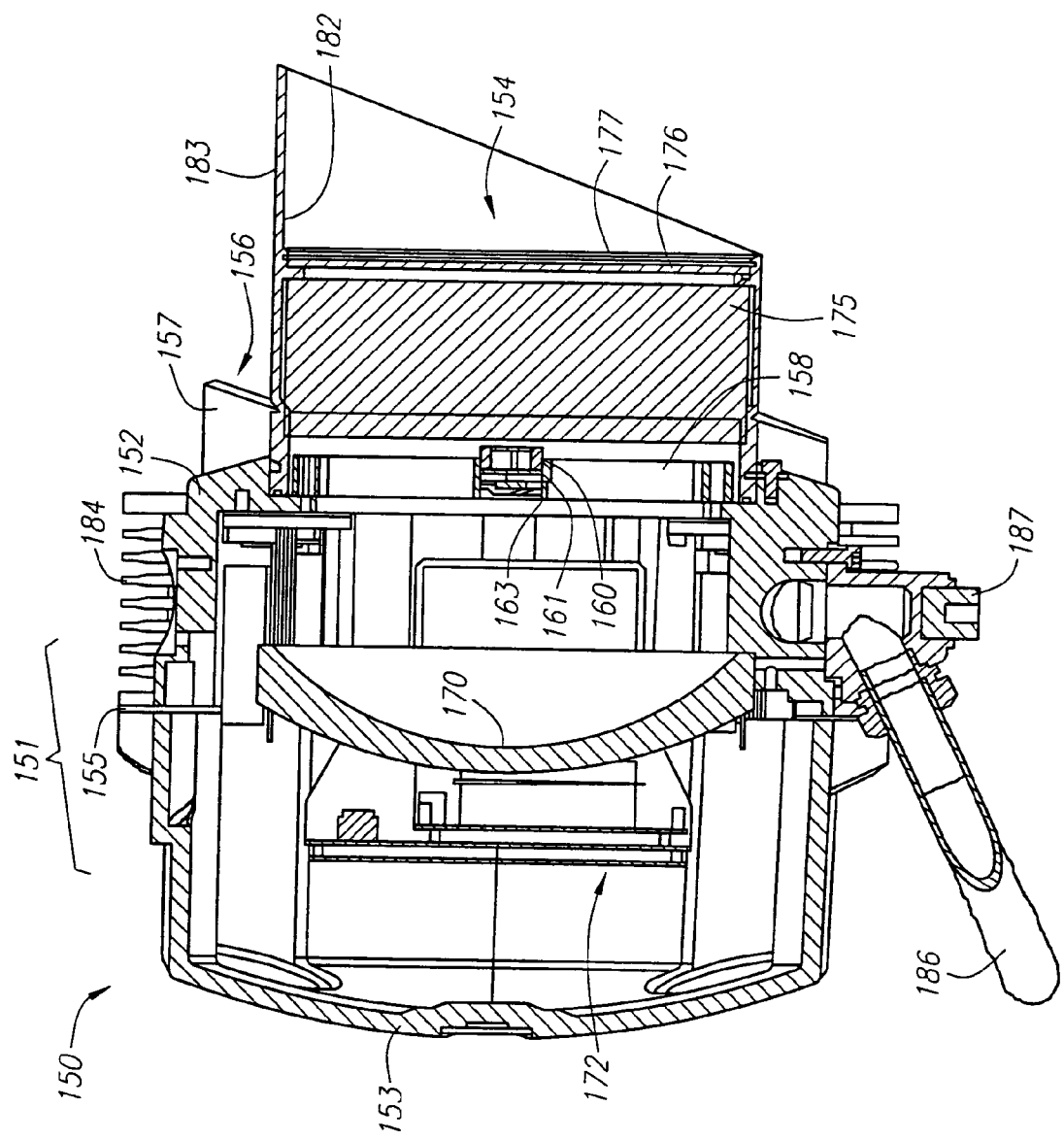
FIG. 5 is a side sectional view of a transceiver and associated housing according to a third embodiment.
Figure 6B:
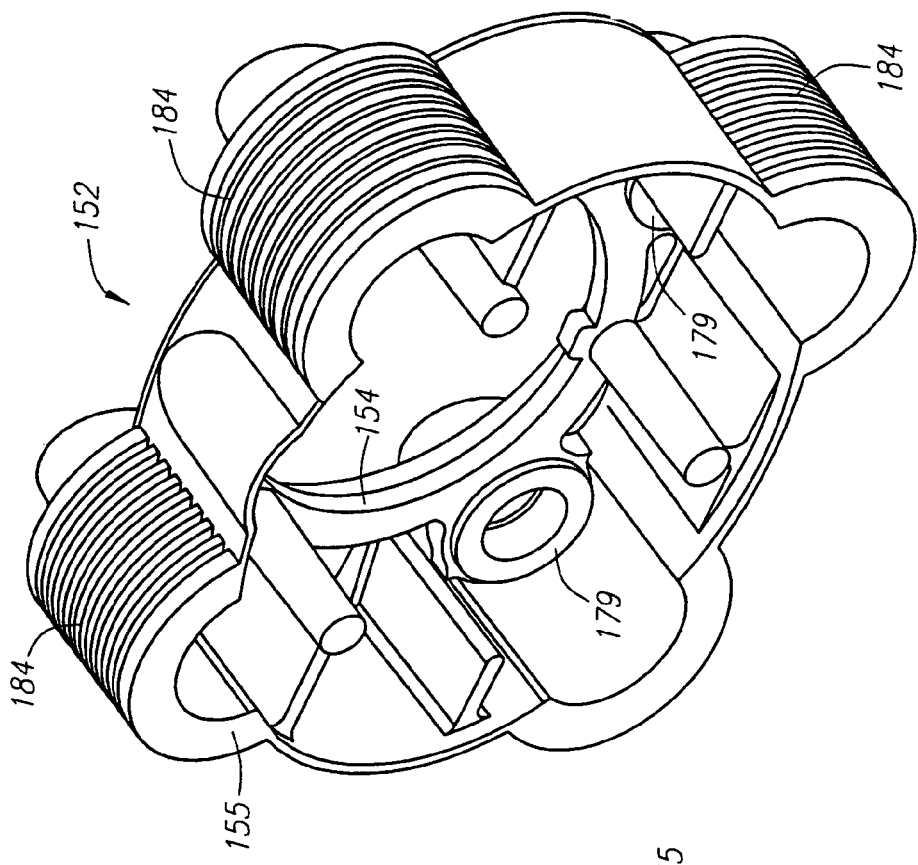
FIG. 6B is a rear perspective view of a front portion of the housing depicted in FIG. 5.
Figure 6A:
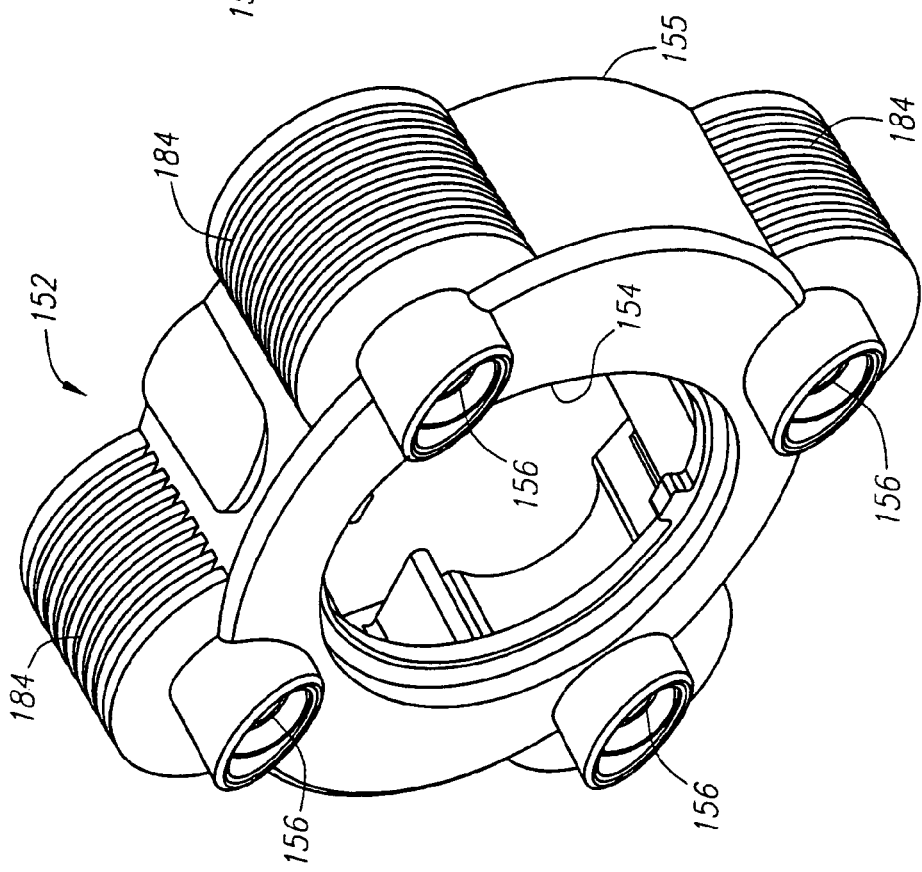
FIG. 6A is a front perspective view of a front portion of the housing depicted in FIG. 5.
Figure 7B:
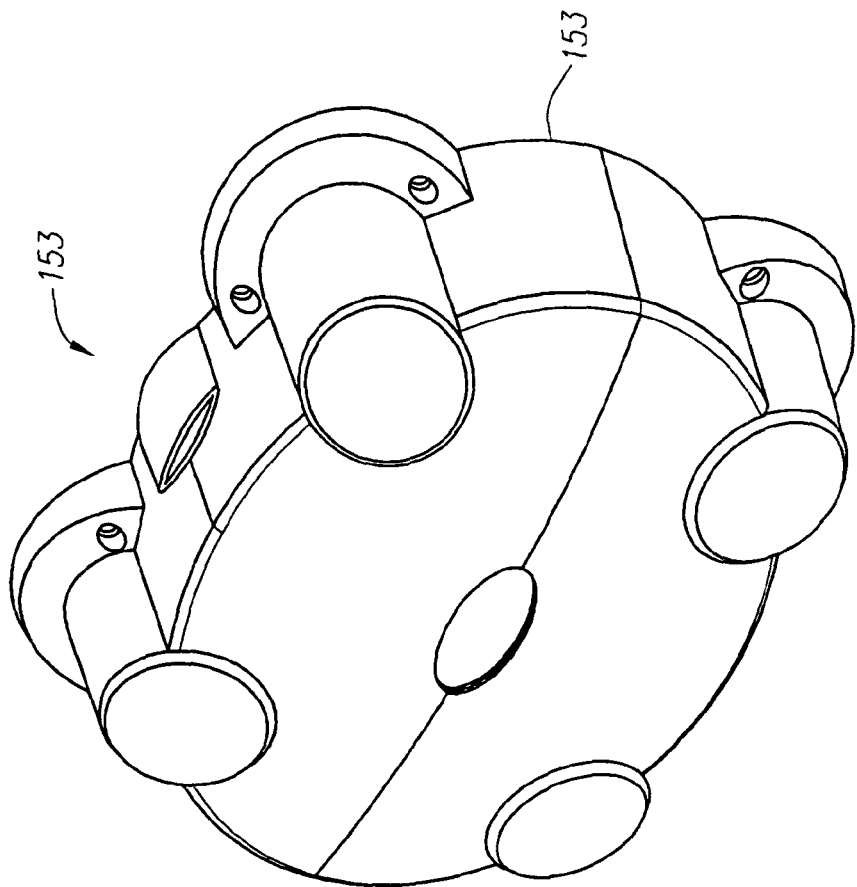
FIG. 7B is a front perspective view of a rear portion of the housing depicted in FIG. 5.
Figure 7A:
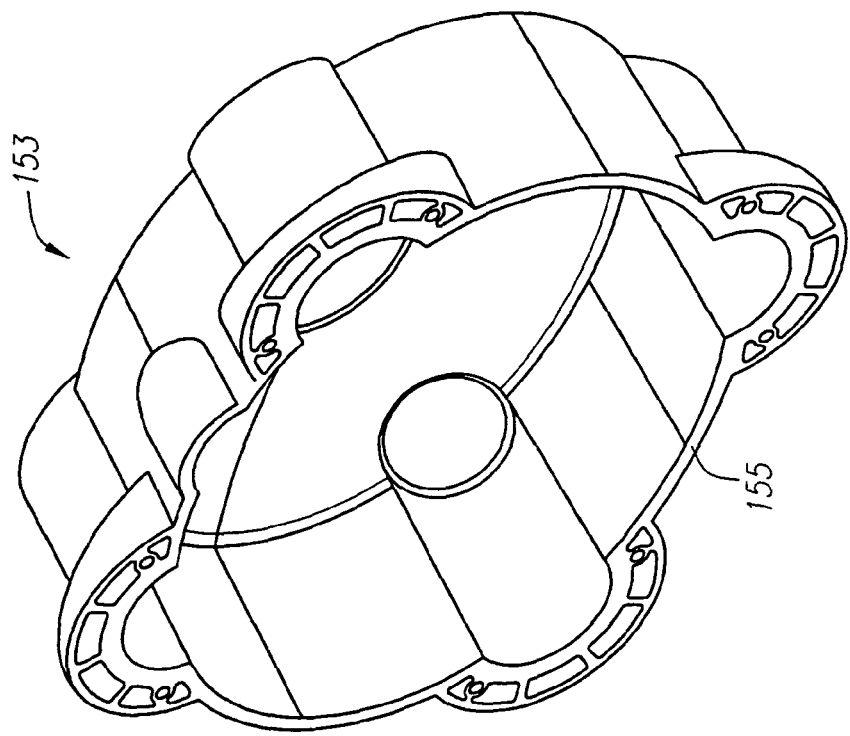
FIG. 7A is a front perspective view of a rear portion of the housing depicted in FIG. 5.

FIG. 4 is a schematic representation of a laser transceiver 100 according to another embodiment. The transceiver 100 includes a combined laser transmitter/laser driver module 110, a receiver module 120, and associated electronics 130. Starting with the receiver module 120, an incident laser beam is reflected by a reflector 122 and focused through a background rejection filter 123 onto a photodiode 124 located at the focal point of the focusing reflector 122. From the photodiode 124, the signal is carried to a preamplifier 125 preferably contained within the laser receiver module 120, and then sent to signal conditioning electronics 131. After conditioning, the signal is provided to an output signal interface 132, which may include a fiber transmitter for transmitting an optical signal to a fiber optic cable. Electrical signals may alternatively be output, such as via a Category 5 cable. A switching device 140, which may include a switch or router portion to enable transmission of various electrical or optical signals (including TCP/IP, IPX, Fast Ethernet, SONET, ATM, or other signal types, on various physical layers such as STS-3, STS-12, OC-3, or OC-12) receives the output signal.

In the illustrated embodiment, the switching device 140 is coupled to a computer 142 having a network interface card 143. The personal computer 142 may further have an audio/video interface card 144 for receiving audio and video signals. The switching device may be connected with various electrical or optical input types, such as Category 5 cable using RJ-45 connectors, or fiber optic cable. An optional stand-alone RF (radio frequency) backup transceiver 146 may further connect to the switching device 140.

On the input/transmitter side, high bandwidth digital input signals are provided to the transceiver 100 via a switching device 140. A high bandwidth signal is conventionally considered to be a signal of 10 Mbps or greater. One skilled in the art will recognize that any high bandwidth signal may be used as input to the transceiver 100, so long as appropriate electronics are provided, when necessary, to convert the high bandwidth input signal into a high bandwidth digital signal. Input signals may be provided through the switching device 140 to the transceiver 100 by way of an input signal interface 134, which in one embodiment may include a fiber optic receiver for receiving digital signals from a fiber optic cable. The signal is then provided to signal conditioning electronics 135, and thereafter provided to a splitter 136. The splitter 136 splits the signal into four identical signals at one-quarter of the power. Each signal emerging from the splitter 136 is provided to a laser driver circuit 111 and ultimately provided to a laser diode 115. The laser driver circuit 111 includes a DC bias circuit 112 and a high power, high bandwidth power amplifier 114 for driving the laser diode 115. A high power laser driver is conventionally considered to be a laser driver operating at a nominal level of 100 mA or greater. The high power, high bandwidth laser driver circuit is discussed in detail hereinafter, in connection with FIGS. 9–10C. The output of the laser diode 115 is provided to a lens 116, and may be monitored with a fiber optic segment 117 and fed to a photodiode 118 for monitoring the output of the laser diode 115. A thermoelectric cooler 119 and its associated controller 113 are provided to control the temperature of the laser diode 115. The controller 113 is coupled with the thermoelectric cooler 119, which is in thermal communication with the laser diode 115. The controller 113 and the thermoelectric cooler 119 act in conjunction with a temperature sensor (not shown) to stabilize the temperature, and thus the output power, of the laser diode 115. The optimum operational temperature of each laser diode 115 depends on the specifications for the particular laser diode used, as provided by the laser diode manufacturer.

Preferably, output of the laser diode 115 is monitored. One method of monitoring the laser diode 115 is by monitoring its input current, but this method is indirect. A better method is to monitor the transmitted light signal from the laser diode 115. One method of monitoring the light signal is by way of a fiber optic element 117 that may extend into the transmitted light signal from the laser diode 115. This fiber optic element 117 is coupled with a photodiode 118. More preferably, the laser diode 115 is provided with an integral monitor photodiode (not shown), which eliminates the need for a separate fiber optic element 117. The output of the photodiode may be coupled with the modulation signal amplifier 114 to use the sampled laser diode output for controlling the amplifier 114 and in turn the signal strength, thus permitting operation in constant optical power mode. Thus, the modulation signal amplifier 114 may be made responsive to the output of the photodiode 118.

Figure 8:
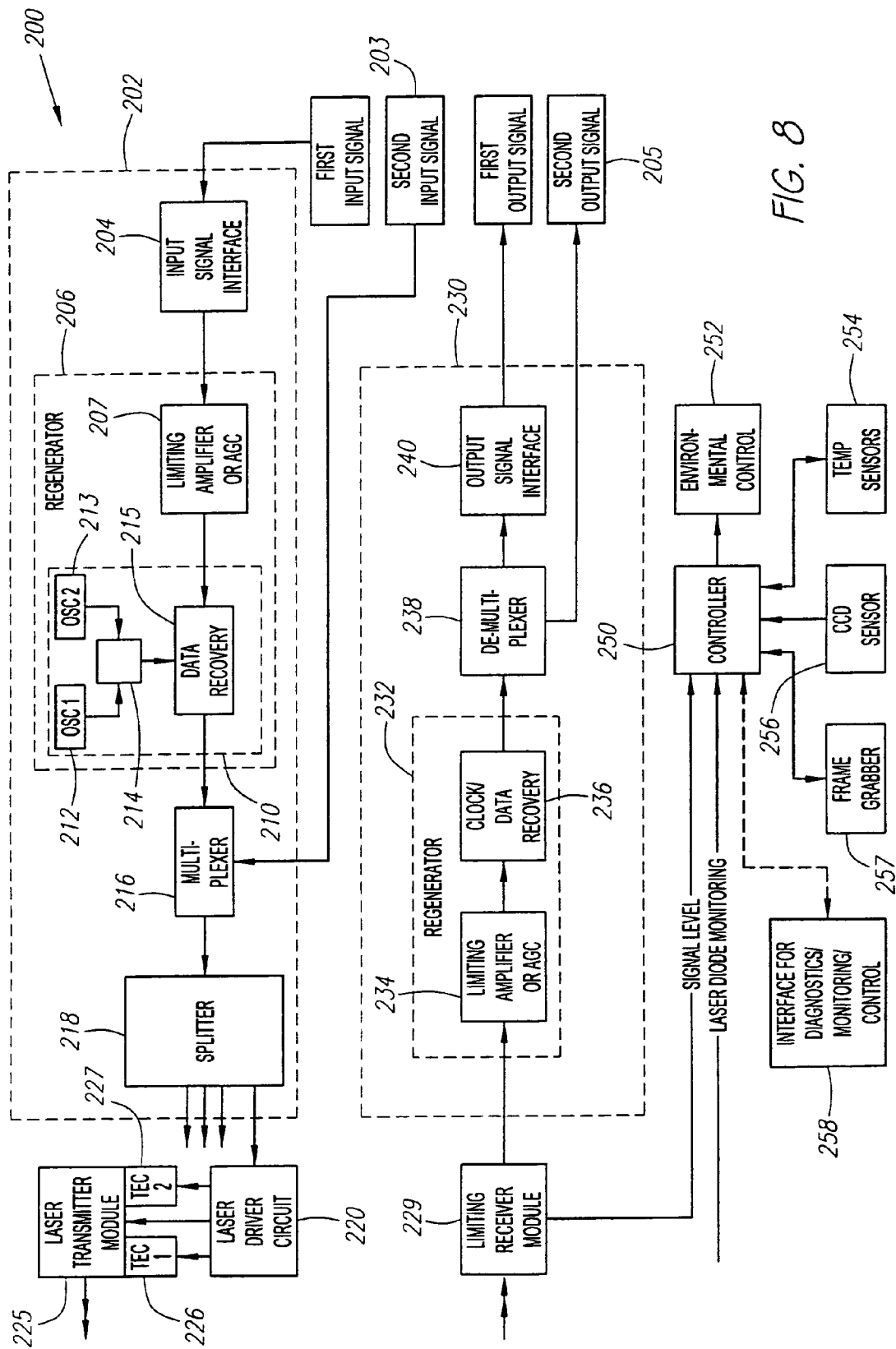
FIG. 8 is a schematic diagram of a transceiver according to a fourth embodiment.

FIGS. 5, 6A, 6B, 7A, and 7B illustrate an alternative compact and high power laser transceiver 150 and its associated housing 151. The housing 151 is designed to both mount the operative components and serve as a protective enclosure suitable for outdoor use. Only three parts, namely, a front portion 152, a rear portion 153, and a snout 182, are designed to interconnect to form the housing 151 to fully enclose the transceiver 150. Of these three parts, the optical payload mounts to only one: the front portion 152. This construction promotes precise positioning of the optical components, since in comparison to the embodiment of FIGS. 3–4, this approach limits the adverse effects of additive dimensional tolerances for multiple structural parts. The front portion 152 includes prominent annular heat sinks 184 to dissipate heat from laser diodes (such as the laser diodes 115 shown in FIG. 4) and from laser drive circuits and associated electronics (such as shown in FIG. 4) contained within the housing. More specifically, an inner surface of each heat sink 184 is in thermal communication with at least one thermoelectric cooler (such the pair of thermoelectric coolers shown in FIG. 8), which in turn transmit heat from the laser diodes (such as shown in FIGS. 4, 8) to the heat sinks 184. Preferably, an annular thermoelectric cooler disposed around the laser diode 115 is used.

The front portion 152 is preferably cast from a lightweight aluminum alloy, but may alternatively be manufactured by various techniques from a variety of suitably durable, strong, and thermally conductive materials, including steel. The housing 151 is designed to mate with the optical payload at four flat interior payload mating surfaces 179 adjacent to the laser apertures 156, preferably by way of screws and tapped holes. The payload mating surfaces 179 further serve as a primary contact surface for transferring heat from laser diodes to the heat sinks 184 by way of thermoelectric coolers. The cast housing 151 is preferably machined along the payload mating surfaces 179 to ensure that all four payload mating surfaces 179 are commonly flat. The front portion 152 is preferably painted to reduce effects of corrosion when subjected to outdoor use. The rear portion 153 does not contain any dedicated heat sinks 184, and therefore does not necessarily need to be fabricated from a thermally conductive material. The rear portion 153 may be manufactured from a plastic suitable for outdoor use, but could also be manufactured using other techniques and other durable materials including metals.

The front portion 152 and rear portion 153 mate along a common surface 155 to form the housing 151 that encloses a reflector 170, four laser transceivers (not shown), a photodiode 160, a background rejection filter 161, one or more field corrector lenses 163, and various electronics 172. The photodiode 160, background rejection filter 161, and one or more field corrector lenses 163 are disposed at the focal point of the reflector 170, and supported by way of a narrow support rod 158 placed across a primary aperture 154. Adjacent and connected to the front portion 152 of the housing 151 is a snout 182 across the primary aperture 154. The snout 182 preferably includes a honeycomb baffle 175 and acrylic filter 176 for the same reasons discussed above in another transceiver embodiment. The snout further includes a protruding hood 183 that further reduces interference from incident light and provides a measure of weather protection for the front cover 177.

Wired (electrical or optical) data and power signals to and from the transceiver 150 are carried to the transceiver 150 by a conduit 186. The transceiver 150 may be supported from below by way of a mounting element 187. The mounting element 187 preferably allows the angular position of the transceiver 150 to be adjusted to facilitate aiming the transceiver 150 at a similar transceiver located remotely.

FIG. 8 provides a schematic representation of a wideband laser transceiver 200 according to a fourth embodiment. On the input side, the transceiver 200 includes various input signal electronics 202, a laser driver circuit 220, and a laser transmitter module 225 with associated thermoelectric coolers 226, 227. On the output side, the transceiver 200 includes a laser receiver module 229 and various output signal electronics 230. In the illustrated embodiment, the transceiver 200 further includes an associated controller 250 in communication with an environmental control system 252, at least one temperature sensor 254, a CCD sensor 256, and an interface for diagnostics, monitoring, network management, and/or control 258. The controller 250 may further include a frame grabber 257, may receive signal level information from the receiver module 229, and may receive monitoring information from the laser diode.

Turning to the input/transmitter side, a first input signal is provided to an input signal interface 204. The input signal is a wideband digital signal, either electrical or optical, according to a variety of signal types (including TCP/IP, Fast Ethernet, SONET, ATM, or other signal types known in the art, on various physical layers such as STS-3, STS-12, OC-3, or OC-12). Various electrical or fiber optic cable connectors may be received by the input signal interface 204 depending on design requirements. Upon receipt of the digital input signals, these signals are provided to a regenerator 206. The regenerator 206 preferably includes an input signal amplifier 207, either a limiting amplifier or automatic gain control, to provide gain, as necessary, and smooth out variations in input signal amplitude. The regenerator 206 further includes a first clock/data recovery circuit 210 to provide protocol independence. The first clock and data recovery circuit 210 includes at least one oscillator 212, such as a crystal, to regulate the clock frequencies. When more than one oscillator is provided, the integrated circuit utilizes two phase locked loops to permit modulation as different frequencies, so as to accommodate more than one data transmission protocol, such as TCP/IP, Fast Ethernet, SONET, and ATM. Thus, a single transceiver 200 is enabled to transmit and receive more than one of the aforementioned protocols. Switching between clock frequencies may be performed by manually substituting an existing oscillator 212 with an oscillator of a different frequency. More preferably, as shown in FIG. 8, multiple oscillators 212, 213 may be built into the transceiver 200, and a switch 214 may accomplish switching between the oscillators 212, 213. This switching may be controlled manually, or, more preferably, by a controller 250, such as by using transistor-transistor logic. Either oscillator 212, 213 provides a clock signal to the data recovery electronics 215.

Upon regeneration, the digital signal may be provided to an optional multiplexer 216 to be combined with at least one additional signal from a second input signal source 203. The additional signal may be of various types, such as T1, Ethernet, telemetry information, tracking information, or other signals known to those skilled in the art. Thereafter, the combined signal is provided to a splitter 218 that divides the digital signal input into four substantially equal components comprising the same signal input at one-quarter of the power. The four laser data signals are transported to a plurality of high power, high frequency laser driver circuits 220, each of which modulates a laser diode contained within the laser transmitter module 225. Only one of the four laser drivers 220 is illustrated. The remaining three laser drivers 220 and laser diodes (within the laser transmitter module 225) are preferably identical to those depicted. The laser diodes within the transmitter modules 225 are displaced from one another, aligned, and facing in parallel directions. As previously described, each diode preferably has a collimating lens (not shown).

In addition to modulating the laser diode within the laser transmitter module 225, the laser driver circuit 220 controls thermoelectric coolers 226, 227 associated with the laser diode to stabilize the temperature, and thus the output power, of the laser diode. Further details regarding control of thermoelectric cooler associated with the transceiver 200 will be discussed hereinafter.

Turning to the output/receiver side, an incident laser beam is received by the laser receiving module 229 and converted to a preamplified electrical signal. The signal is provided to output signal electronics 230, which includes several elements. First the signal is provided to a second regenerator 232. The regenerator 232 preferably includes a signal amplifier 234, either a limiting amplifier or an automatic gain control, to provide gain, as necessary, and smooth out variations in signal amplitude. The second regenerator 232 preferably further includes a second clock/data recovery unit 236. The second clock and data recovery unit 236 preferably also comprises a switchable dual oscillator such as the dual oscillator 212, 213 shown in connection with the first clock and date recovery unit 210, and operates in a similar manner. Upon regeneration, the resulting digital electronic signal may be provided to an optional de-multiplexer 238 to segregate at least one additional output signal 205. Following de-multiplexing, the digital signal remaining in the output signal electronics 230 is passed to an output signal interface 240. An output signal interface 240 converts the electronic signal into an appropriate output signal, such as an electronic or optical signal. Either electrical or optical interfaces may be provided, subject to the inclusion of appropriate hardware as would be apparent to one skilled in the art. In one embodiment, the output signal interface 240 includes a fiber transmitter that converts the electronic signal to an optical signal, and further includes a fiber optic connector for connecting a fiber optic cable. The primary output signal is a wideband digital signal, and may be in accordance with various protocols known in the art, including TCP/IP, IPX, Fast Ethernet, SONET, or ATM, and may operate on various physical layers known in the art, including STS-3, STS-12, OC-3, or OC-12. Although depicted separately, the output signal interface 240 and input signal interface 204 may be combined, and if the interfaces 204, 240 include a fiber optic transmitter and a fiber optic receiver, then an integrated fiber optic transceiver may be used.

A controller 250, preferably a microprocessor-based digital controller or computer, is advantageously provided, primarily to detect and monitor various aspects of the transceiver 200. This capability may provide both real-time and historical data logging for status monitoring, performance monitoring, network management, and/or troubleshooting. When the transceiver 200 is first powered, the computer 250 may sample the amount of current being supplied to the lasers through the laser drivers 220 to ensure that the lasers sufficient power to transmit signals. During operation, the computer 250 monitors the temperature levels of the laser diodes within the laser transmitter modules 225. If the temperature of any of the diodes exceeds the optimum operational temperature as specified by the laser diode manufacturer, then the computer 250 may take one or more steps to alleviate the overheating, such as alerting appropriate technical personnel, shutting down one or more of the laser transmitters 225, or any other appropriate actions. The computer 250 preferably also monitors the voltages supplied to the photodiodes (not shown), the modulation signal to the laser driver amplifier within the laser driver circuit 220, and the DC bias circuit (also part of the laser driver circuit 220). The measured voltages are preferably converted to a current value that is compared to pre-set values in a look-up table, customized for the individual laser diode, to further ensure the proper functioning of the transceiver 200. If the transmitted laser beam signal is monitored with a photodiode, the output of the photodiode may be coupled with the controller 250, to provide laser performance information, or permit the lasers to be operated at constant signal strength. The controller 250 may also monitor signal level from the laser receiver module 229. Furthermore, the controller 250 and may receive signals from a CCD sensor 256, and, utilizing a frame grabber extension 257, the controller 250 may capture images of what is within the line of sight of the transceiver 200.

One interface that may be used by the controller 250 to perform its functions is a RS-232 interface format utilizing SNMP (Simple Network Monitoring Protocol), although other interface formats, including establishment of an Ethernet connection with the controller 250, may alternatively be used. In a preferred embodiment, the controller 250 is a computer which is used primarily for diagnostic purposes and may be polled remotely using a modem, over the Internet using an (Ethernet) HTML browser, or other such communication means as are known in the art, thus permitting remote information monitoring and/or control. While the controller 250 is preferably a microprocessor-based digital computer, a dedicated digital signal processor may alternatively be used.

Additionally, the controller 250 interfaces with environmental controls 252 including additional temperature sensors 254, as may be provided within an enclosure surrounding the transceiver 200, to regulate the temperature and humidity experienced by the transceiver 200 and provide optimal environmental conditions for the transceiver 200 to operate. Heat sinks, such as the heat sinks 184 provided in FIGS. 5–6B may also be added to the outside of a transmitter enclosure or housing 151 to aid with environmental control.

Figure 9A:
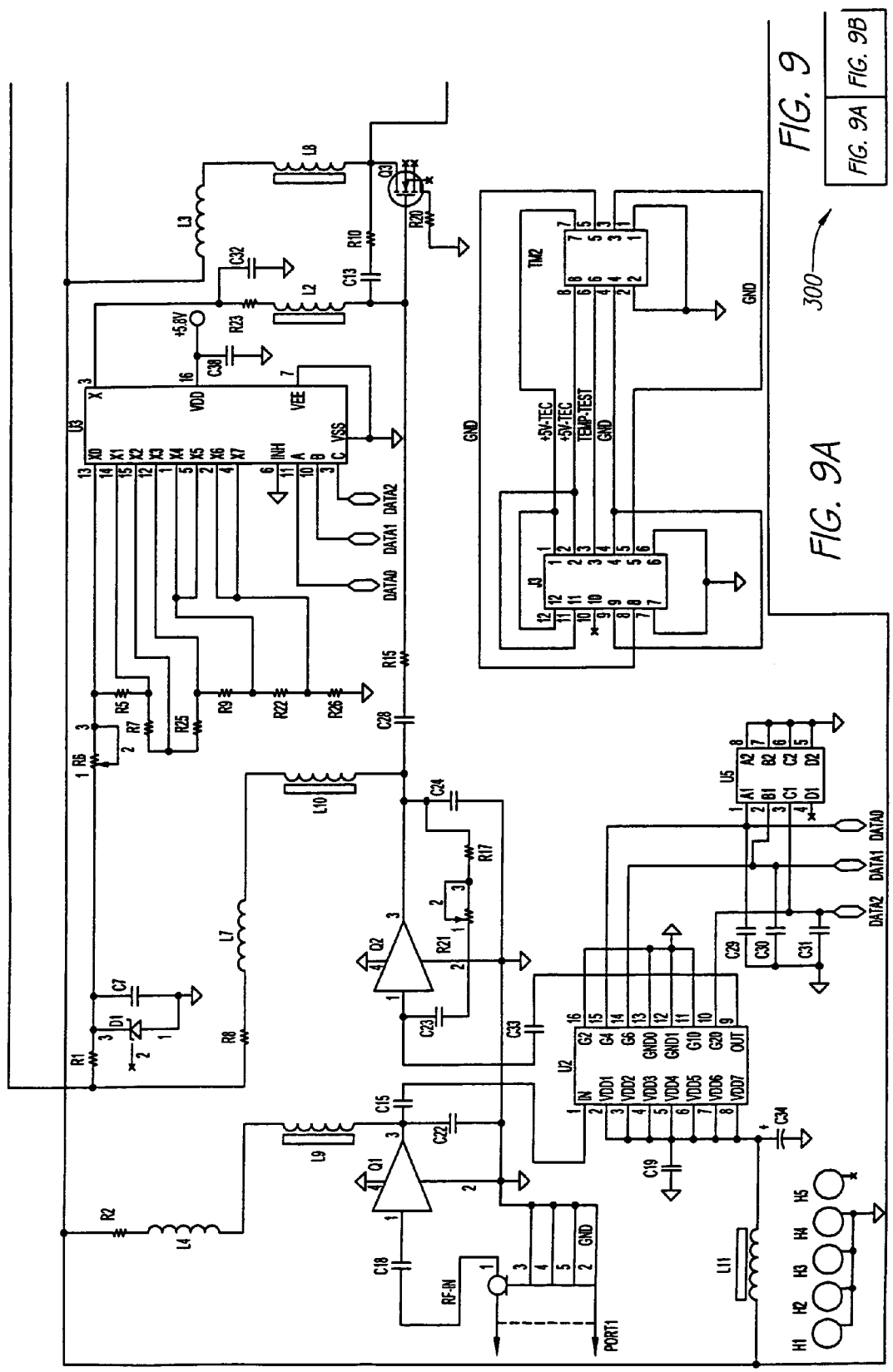
FIG. 9A is a first magnified portion of the schematic diagram depicted in FIG. 9.
Figure 9B:
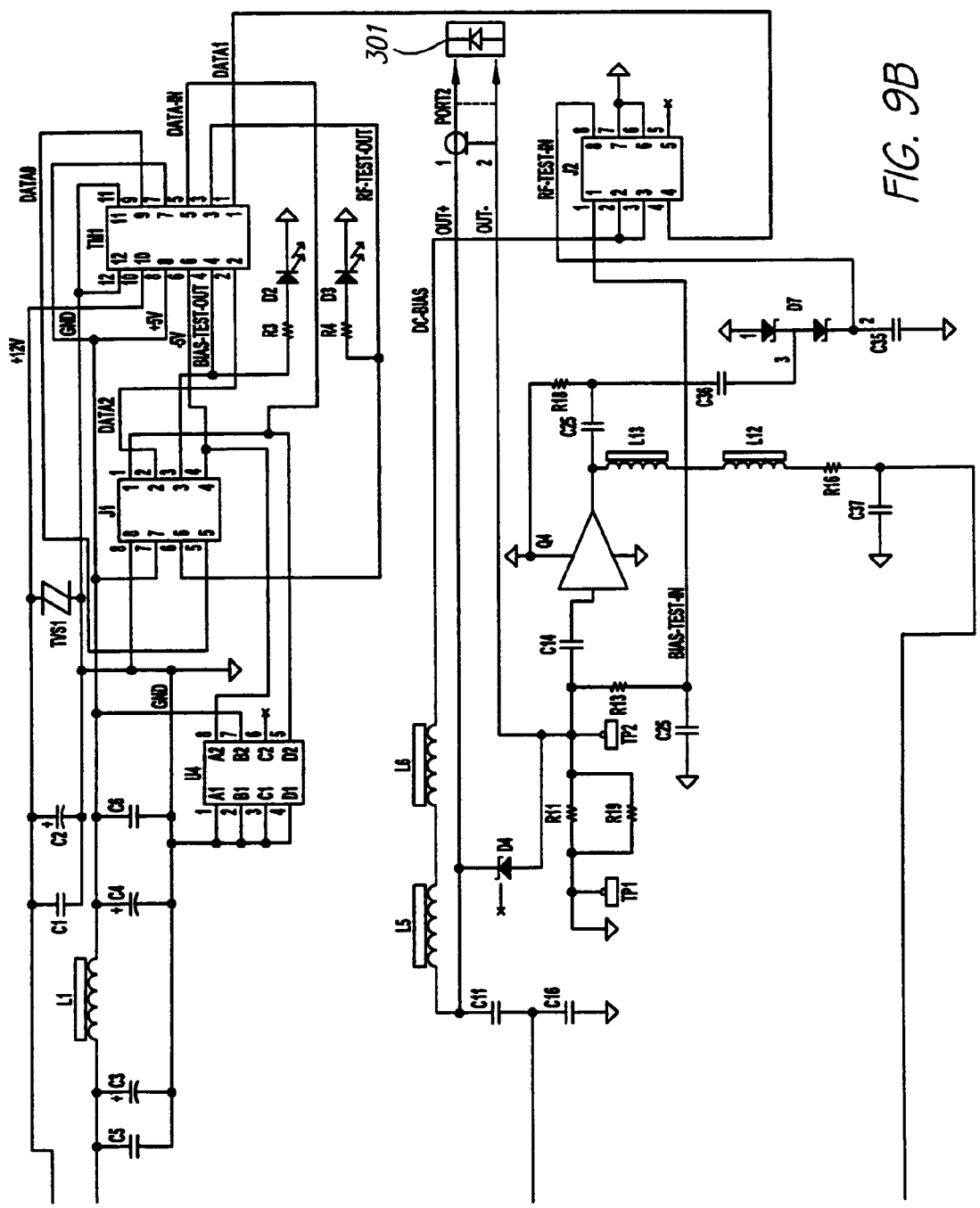
FIG. 9B is a second magnified portion of the schematic diagram depicted in FIG. 9.
Figure 10B:
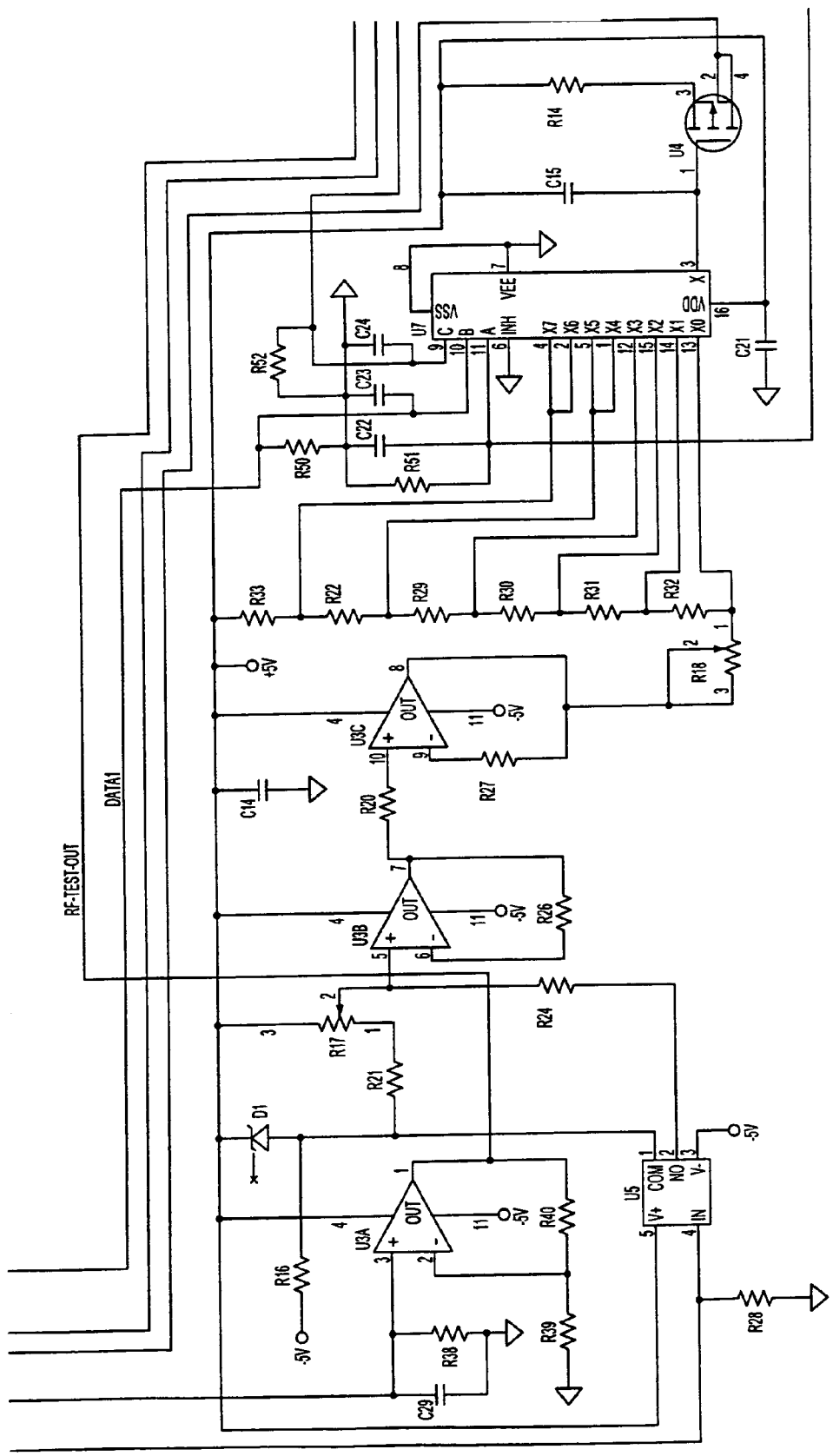
FIG. 10B is a second magnified portion of the schematic diagram depicted in FIG. 10.
Figure 10C:
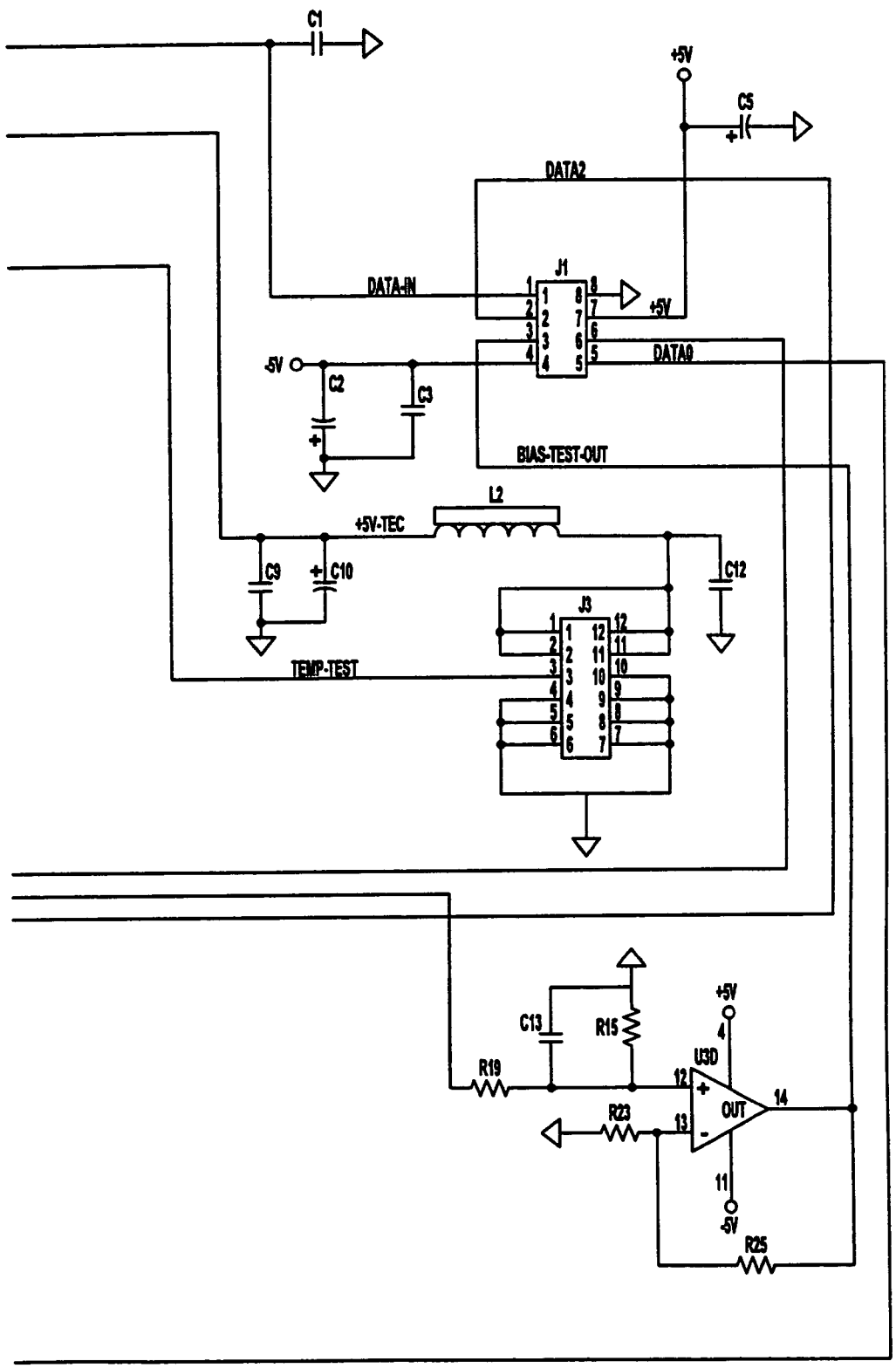
FIG. 10C is a third magnified portion of the schematic diagram depicted in FIG. 10.

The laser driver 300 that is schematically illustrated in FIGS. 9–10D includes control circuitry for a thermoelectric cooler (TEC). A TEC is used to stabilize the temperature of the laser diodes against temperature fluctuations, thus reducing thermal stress. Reducing thermal stress to the laser diode typically stabilizes laser wavelength over time and enables the laser diode to have a longer life. The TEC controller as described herein permits highly efficient control over the TEC under circumstances where the laser drivers are operating at maximum load, even in conditions of hot weather. In fact, operating of the thermoelectric cooler power amplifier as a controlled current source to supply the thermoelectric cooler results in near-perfect efficiency when maximum cooling is required.

The TEC controller operates off a 5V supply. A power FET U8, preferably an NDT 456P or similar device, is used as a voltage-controlled current source to supply current to the TEC. The power FET U8 and the TEC TM2 are connected across the 5V supply. The TEC TM2 used preferably (1) provides the required maximum cooling capacity when operated at a near-optimum current, and (2) has an impedance at this optimum operating current that results in a 5V drop across the TEC TM2. Thus, when maximum cooling capability is required of the TEC TM2, the 5V supply voltage is dropped entirely across the TEC TM2 and only about 0.1lV is dropped across the power FET U8, resulting in greatly enhanced efficiency under the most thermally stressing conditions. The power FET U8 is controlled through four op-amps U1A, U1B, U1C, U1D, which preferably comprise an LM2902M or similar device.

A thermistor TM1 having a 10 kohm impedance at 25° Celsius is used to sense the temperature of the laser diode. A regulated 5V supply source is provided through a 40 kohm resistor R11 and the thermistor TM1, resulting in a nominal 100 $\mu$A current through the thermistor TM1 and a voltage drop of approximately 1V across the thermistor TM1 at 25° Celsius. The thermistor is advantageously operated as part of a voltage divider circuit. The voltage drop across the thermistor TM1 changes with temperature and is sensed by op-amp U1A. The same 5V supply source is used to generate a 1V reference voltage using resistors R12, R34. This 1V reference source is sensed by op-amp U1B. In other words, the TEC control circuit compares temperature sensor voltage drop from the thermistor with a reference voltage, which corresponds to a voltage that would result if the thermistor were operated at a desired setpoint temperature. The difference between the output voltages of op-amps U1A and U1B is amplified by op-amp U1C. The output from op-amp U1C is the error signal associated with the desired temperature setpoint versus the actual laser temperature. The temperature setpoint in the embodiment depicted is 25° Celsius. Op-amp U1D and its associated resistors R45, R46 provide the error signal to the power FET U8 with the appropriate gate bias resistors R43, R44 and loop gain. The control signal to the power FET is integrated by resistor R47 and capacitor C8 to provide a gentle time constant so the current applied to the TEC is not impulsive. The time constant is preferably greater than 0.5 second, and more preferably approximately 1.0 second. Such a gentle time constant is desirable so that stress to the TEC is minimized, thus extending the life span of the TEC.

In a preferred embodiment utilizing TECs to cool the laser diodes, two TECs are coupled in series to cool a single laser diode. The TECs preferably comprise Melcor CPO 0.9-21-06 or similar devices. Such TECs operate at nearly optimum efficiency at 1.25 A and have an impedance of 2 ohms when operated at such a current. Thus, the total impedance of the two in series TECs is 4 ohms. When the maximum current of 1.25 A is drawn, approximately the full 5V supply voltage is dropped across the TECs, resulting in less than a 0.1V drop across the power FET U8 under maximum cooling circumstances. In less demanding conditions requiring less cooling, the power FET U8 controls the current to the TECs by dropping some of the voltage across Vds. For example, when only 50% of the maximum current is required to cool the laser diode, the TECs draw approximately 0.63 A and drop 2.5V, with the remaining 2.5V appearing as Vds. Such circumstances represent a worst case scenario for dissipation in the controller, which is only 1.6 W. However, this worst case scenario occurs in cooler weather when the thermal stress on the overall system is reduced and the overall heat load can be more readily dissipated into the surrounding environment.

The above TEC controller circuit may be modified to use a 3.3 V supply source instead of a 5 V supply source. A 3.3 V supply source is more appropriate for less demanding cooling requirements. The TEC may also be modified to act as a both a cooling and heating element within the transceiver by providing a bipolar voltage supply source of +5v and −5V.

Notably, operation of a TEC as described above is not limited to controlling heat transfer from laser diodes. Instead, the TEC operation described above could apply to most any item that needs to be temperature-controlled. Operation of a power amplifier (preferably by way of a low voltage power source) as a controlled current source provides near-perfect efficiency when maximum cooling is required. When designing such a cooling system, the maximum cooling requirement of the item to be temperature controlled should be considered in light of the fact that a thermoelectric cooler has a characteristic impedance and an optimal operating current. The desired result may be achieved by selecting the optimal operating current of the thermoelectric cooler to correspond with the maximum cooling requirement of the item to be temperature controlled, and further selecting the impedance of the thermoelectric cooler to drop substantially all of the supply voltage when the thermoelectric cooler is operated is to provide the maximum cooling requirement of the item. If maximum cooling efficiency is desired, then lower power supply voltages are preferable.

Accordingly, improved thermoelectric cooler circuitry and methods of operating the same are disclosed. While the thermoelectric cooler circuit and method are discussed herein within the context of a laser communication system, and specifically for purposes of cooling the laser diode associated with such a system, it would be apparent to those skilled in the art that many different applications and other modifications are possible without departing from the inventive concepts herein. The invention, therefore, is not to be restricted except in the spirit of the appended claims.

What is claimed is:
1. A thermoelectric cooler circuit comprising:
   a temperature sensor in thermal communication with a component;
   a thermoelectric cooler in thermal communication with the component; and
   a power amplifier electrically coupled to the thermoelectric cooler, the power amplifier operating as a controlled current source to efficiently supply current to the thermoelectric cooler when maximum cooling of the component is required,
   wherein the impedance of the thermoelectric cooler drops substantially all of a supply voltage when meeting a maximum cooling requirement of the component.
2. The thermoelectric cooler circuit of claim 1, wherein the temperature sensor comprises a thermistor.

3. The thermoelectric cooler circuit of claim 2 further including a voltage divider circuit, wherein the thermistor is included in the voltage divider circuit.

4. The thermoelectric cooler circuit of claim 2, wherein the voltage drop across the thermistor is compared to a reference voltage which corresponds to the voltage drop across the thermistor when the thermistor is operated at a desired setpoint temperature.

5. The thermoelectric cooler circuit of claim 1, wherein the power amplifier is a power FET.

6. A method of operating thermoelectric cooler circuitry comprising:
   selecting a thermoelectric cooler to have an optimal operating current that corresponds with the maximum cooling requirement of a component to be temperature-controlled;
   selecting the thermoelectric cooler to have an impedance that drops substantially all of the supply voltage when the thermoelectric cooler is operated to provide a maximum cooling requirement to the component;
   placing a temperature sensor and the thermoelectric cooler in thermal communication with the component, the temperature sensor and the thermoelectric cooler being electrically coupled to a power amplifier;
   sensing the temperature of the component using the temperature sensor; and
   operating the power amplifier as a controlled current source to supply current to the thermoelectric cooler at near-perfect efficiency when maximum cooling of the component is required.

7. The method of claim 6, wherein the temperature sensor is a thermistor.

8. The method of claim 6, comprising providing a voltage divider circuit and a regulated supply voltage and integrating the thermistor into the voltage divider circuit.

9. The method of claim 6 further comprising operating the power amplifier using a power supply voltage of approximately 5 volts or less.

* * * * *